US008592729B2

(12) United States Patent
Nelson et al.

(10) Patent No.: US 8,592,729 B2

(45) Date of Patent: Nov. 26, 2013

(54) GLASS-CERAMIC PANEL AND ITS MANUFACTURING PROCESS

(75) Inventors: Mieke Nelson, Greer, SC (US); Pablo Vilato, Paris (FR)

(73) Assignee: Eurokera S.N.C., Chateau-Thierry (FR)

( * ) Notice: Subject to any disclaimer, the term of this patent is extended or adjusted under 35 U.S.C. 154(b) by 380 days.

(21) Appl. No.: 12/529,134

(22) PCT Filed: Feb. 27, 2008

(86) PCT No.: PCT/FR2008/050327

§ 371 (c)(1), (2), (4) Date: Sep. 2, 2009

(87) PCT Pub. No.: WO2008/110737

PCT Pub. Date: Sep. 18, 2008

(65) Prior Publication Data

US 2010/0089905 A1 Apr. 15, 2010

(30) Foreign Application Priority Data

Mar. 2, 2007 (FR) ..................................... 07 53616

(51) Int. Cl.
*H05B 3/68* (2006.01)
*B32B 17/06* (2006.01)

(52) U.S. Cl.
USPC .................... 219/452.11; 219/460.1; 428/426

(58) Field of Classification Search
USPC ............ 219/443.1–468.2; 428/426, 428, 429; 501/11, 14, 17, 20
See application file for complete search history.

(56) References Cited

U.S. PATENT DOCUMENTS

| | | | | |
|---|---|---|---|---|
| 6,660,980 | B2 * | 12/2003 | Nagata et al. | 219/622 |
| 2003/0087106 | A1 | 5/2003 | De Witzmann et al. | |
| 2004/0091718 | A1 | 5/2004 | Striegler | |
| 2005/0224491 | A1 * | 10/2005 | Vilato et al. | 219/443.1 |
| 2007/0003769 | A1 | 1/2007 | Striegler | |
| 2007/0232476 | A1 | 10/2007 | Siebers et al. | |
| 2008/0035896 | A1 | 2/2008 | Striegler et al. | |

FOREIGN PATENT DOCUMENTS

EP 1 770 071 4/2007

* cited by examiner

*Primary Examiner* — Sang Paik

(74) *Attorney, Agent, or Firm* — Oblon, Spivak, McClelland, Maier & Neustadt, L.L.P.

(57) ABSTRACT

A glass-ceramic panel, which may cover or receive at least one heating element, and may serve as a cook-top The panel is coated, in at least one region of a face, with a coating such that the total color difference delta E*, measured on the opposite face, between said coated region and an uncoated region, is less than about 1 and/or such that this coating has a luminance L* of greater than about 70. A process for manufacturing the panel and a cooking device comprising said panel.

21 Claims, 2 Drawing Sheets

GLASS-CERAMIC PANEL AND ITS MANUFACTURING PROCESS

BACKGROUND OF THE INVENTION

1. Field of the Invention

The present invention relates to a glass-ceramic panel (or plate) intended in particular for covering or receiving heating elements, in particular intended to serve as a cook-top (or hob), and to its manufacturing process.

2. Description of the Related Art

The sales of glass-ceramic cook-tops have been continuing to grow over the last few years. This success is explained in particular by the attractive appearance of such cook-tops and by the ease of cleaning them.

It will be recalled that a glass-ceramic is originally a glass, called precursor glass, the chemical composition of which allows controlled crystallization to be induced by suitable heat treatments, called ceramification. This partly crystallized specific structure gives the glass-ceramic unique properties.

At the present time, there are various types of glass-ceramic panels, each variant being the result of extensive research and many tests, given that it is very difficult to make modifications to these panels and/or to the process for obtaining them without risking an unfavourable effect on the desired properties. To be able to be used as a cook-top, a glass-ceramic panel must generally have a transmission in the wavelengths in the visible range that is both low enough to mask at least some of the subjacent heating elements when not in use and high enough so that, for the sake of safety, the user can visually detect the heating elements that are in operation. It must also have a high transmission in the wavelengths of the infrared range.

Most current panels are of dark color, in particular black, but there are also panels of lighter color (in particular white or cream color having, for example, a haze of at least 50%, as described in patent FR 2 766 816), or even transparent panels provided with opacifying coatings. Among known coatings for glass-ceramic panels are in particular enamels or paints, which coatings may be, depending on the case, on the upper face (in the use position) and/or lower face of the panel, and it is possible for these coatings to be of decorative and/or functional character, for example able to represent logos and/or to delimit heating regions, and/or able to mask underlying elements (underlying metal structures or heating elements), etc.

The advantages of coatings on the lower face (or more generally on the unexposed face, after the panel has been mounted in the use position) are especially better protection of these coatings from soiling and abrasion (mainly undergone by the exposed face of the panel), easier manufacture and handling (in particular when all the coatings are on this same face) and improved comfort for the user (easier cleaning of the exposed face). However, these coatings also have drawbacks such as greater risk of thermal degradation near the heating elements, or certain irksome optical effects visible on the exposed face (as the case may be, double images, appearance and/or contrast variations depending on the closeness of the underlying elements and/or on the border, iridescence phenomena whereby the color appears different depending on the angle at which the panel is observed or depending on the angle of illumination of the panel, etc.).

In conventional dark-colored panels, it is known to deposit, on the lower face, a dark (black or dark grey) coating forming a screen for concealing, for example, the framework of the structure (such as a cooker) or the frame or sections on which the panel has to be mounted. Although this use is widespread and satisfactory for dark panels, it is however not very appropriate for light-colored panels on which unattractive effects and reflections are more easily noted (in particular iridescence phenomena or color differences appearing on the upper face between the coated part and the uncoated part) partly due to this screen. Another solution consists in mounting a dark opacifying intermediate element (such as an aluminium foil or intermediate aluminium parts), but this requires the addition of a further element and may also generate unattractive effects and reflections.

BRIEF DESCRIPTION OF THE INVENTION

The object of the present invention was therefore to propose a solution suitable for light-colored panels, especially to find a simple and inexpensive solution for suitably masking, in particular from their unexposed face (or lower face or rear face, etc.), elements covered by the panel without undesirable unattractive effects (reflections, color changes, etc.), the modifications made combining with said panels for a homogeneous effect without said modifications having a deleterious effect on the properties usually desired.

DETAILED DESCRIPTION OF THE INVENTION

This solution consists in proposing a novel glass-ceramic panel having a coating that gives said panel a uniform appearance, in particular making it possible to obtain, when the panel is mounted and/or in use, a homogeneous coloration between the coated parts (serving in particular for masking elements for supporting or mounting the panel) and the uncoated parts. As will be explained in detail later, since the panel is in particular light in color and the coating (over at least one region) is on the unexposed face, the color variation (which may be translated by delta E* values as defined below) on the exposed (opposite) face, visible to the user, remains limited, for example in the case of the panel being mounted on a cooker, over the entire visible surface of the panel including vertically in line with the mounting frame or support means.

The novel panel according to the invention is a glass-ceramic panel, intended for example to cover or receive at least one heating element, in particular intended to serve as a cook-top, said panel being coated, in at least one region of a face, with a coating such that the total color difference delta E*, measured on the opposite face, between said coated region and an uncoated region, is less than about 1 and/or such that it (the coating) has a luminance L* of greater than about 70.

The term "coating" is understood within the present invention to mean a coating of the paint type or based on one or more resins, or even of the enamel type, this coating generally being deposited in liquid or semi-liquid form (for example in the form of a paste) and generally undergoing a drying operation, a hardening operation and/or a subsequent curing operation.

The term "glass-ceramic panels" is understood hereafter to mean not only panels made of actual glass-ceramic but also panels made of any other similar material that is resistant to high temperature and has a zero or almost-zero expansion coefficient (for example less than $15\times10^{-7}$ $K^{-1}$). However, the panel is preferably an actual glass-ceramic panel.

In the present invention, the panel is more particularly based on a semi-transparent or translucent glass-ceramic of light color (other than black or brown), in particular a glass-ceramic panel of substantially white color (appearing white to the look, or cream or vanilla or tending very slightly towards yellow or other tints). Such panels are for example sold under the names KERAWHITE, or KERABISQUE/KERABISCUIT or KERAVANILLA by the society Eurokéra.

Advantageously, the aforementioned coating is on at least one region of the face of the panel that is intended to be concealed in the mounted and/or use position, this face generally being that turned towards the heating elements in the use position (the lower or inner or rear face). This coating covers at least one region of said face, for example all or part of the peripheral region of this face, this region generally being intended to cover at least one or more mounting or support elements, and may cover several regions or even a substantial portion of said face (or its entirety) with, however, in general the exception of at least the heating regions, the distance between said regions and the coating being preferably at least 2.5 cm. The coating may serve to at least partly mask elements, such as support or mounting components or frames (these components generally also being substantially white or painted white in the case of light-colored panels), but may also serve, where appropriate, for masking other elements such as displays, or even heating elements (while still allowing them to be detected when in operation), etc.

The present invention has demonstrated that, for a light-colored glass-ceramic, the aforementioned coating, also of light color, makes it possible for the undesirable optical effects to be considerably compensated for and attenuated, the interaction between the color of the coating and the color of the panel neutralizing in particular the effects of the different light reflections in certain regions masking elements, preventing unattractive contrasts or iridescence phenomena on the rim, etc. At the same time, the coating fulfils its masking role at the chosen locations and does not impair the properties of the glass-ceramic panel. The coating is completely compatible with existing production lines and may in particular be applied by screen printing using standard fabrics and presses. It is inexpensive and also compatible with all heating types.

The coating has a coloration that can be characterized using colorimetric coordinates denoted by the letters a*, b* and L*, a* and b* characterizing the chromaticity (the a* axis corresponding to the green-red pair and the b* axis corresponding to the blue-yellow pair) and L* characterizing the luminance (or lightness) of the measured specimen (L* ranging from 0 in the case of black to 100 in the case of absolute white), the coordinates in question deriving from the trichromatic coordinates X, Y and Z defined and proposed in 1931 by the CIE (Commission Internationale de l'Eclairage [International Commission on Illumination]), which commission is unanimously recognized as the reference organization as regards colorimetry. The L*a*b* coordinate system, commonly referred to as CIELAB, was the subject of an official CIE recommendation in 1976 (International Commission on Illumination, Colorimetry—Official Recommendations, CIE publication No. 15-2, Vienna, 1986) and this is used in many industrial sectors.

As indicated in the definition of the invention, the coating used is chosen so that the total color difference delta E* (explained later) is less than about 1 (and strictly less than 1.1) and/or so as to have colorimetric coordinates L*, a*, b* such that the L* value of said coating is greater than about 70 (and strictly greater than 69).

The measurements for determining the a*, b* and L* values are made in reflection using a 6800 spectrophotometer (sold by the society Byk-Gardner) having a 45°/0° analysis geometry, 45° corresponding to the direction of illumination relative to the normal to the surface of the specimen and 0° corresponding to the direction of observation relative to said normal, under illuminant $D_{65}$ with a 10° angle of observation. These measurements are made, for the coating alone, on the opaque coating (opaque layer and/or on an opaque white support) and for the translucent glass-ceramic panel of light color (whether coated with the coating or not), on this panel, with a thickness of 4 mm, placed on an opaque white background. Furthermore, the measurements are made on the coating in its definitive form, in particular, where the case may be, when the coating is dried and/or cured (or hardened).

The color change (or contrast or total color difference), or delta E* (dE* or ΔE*), which measures the difference between the color measured on that face of the panel opposite the face bearing the coating, vertically in line with a region coated with the coating and that vertically in line with an uncoated region (placed on the opaque white background), is also determined according to the invention ($\Delta E^*=((L_1^*-L_2^*)^2+(a_1^*-a_2^*)^2+(b_1^*-b_2^*)^2)^{1/2}$ using the formula established by the CIE in 1976, $L_1^*$, $a_1^*$ and $b_1^*$ being the colorimetric coordinates of the first color to be compared and $L_2^*$, $a_2^*$ and $b_2^*$ being those of the second color). In the present invention, the color change delta E* is advantageously less than about 1, preferably less than 0.95. In most cases, it is between 0.3 and 0.9 and even, in particularly advantageous embodiments, between 0.5 and 0.85.

According to the invention, preferably for the aforementioned light-colored panels, the coating has colorimetric coordinates with the exception of white with which certain unappealing reflections may remain. In particular, the value of L* of said coating is between 70 and 90, preferably between 80 and 89.

As indicated above, the panel according to the invention is preferably substantially white, in particular have the following colorimetric coordinates: an L* value between 70 and 87, and more particularly between 70 and 84 (especially, in the case of panels with a white look, ranging from 80.25 to 83.87); an a* value between −6 and 3.5, and more particularly between −6 and −0.5 (especially, in the case of panels with a white look, ranging from −3.43 to −2.27); and a b* value between −15 and 4, and more particularly between −15 and 2 (especially, in the case of panels with a white look, ranging from −4.98 to −3.50).

This panel according to the invention is for example based on a glass-ceramic obtained by ceramification starting from a glass having the following composition expressed in percentages by weight:

| | |
|---|---|
| $SiO_2$ | 63-70 |
| $Al_2O_3$ | 18-22 |
| $Li_2O$ | 2.5-4.5, |

this panel having a haze as defined in patent FR 2 766 816 (the haze being a measure of the light diffusion and being defined as the ratio of the diffuse transmission to the total transmission at a wavelength of 550 nm), in particular a haze of at least 50% and preferably less than 98%.

Advantageously, the coating is chosen so that the difference between the L*, a*, b* values of the coating and the L*, a*, b* values of the panel, in absolute values, is respectively less than 12, 20 and 20 and in particular is respectively less than 8, 8 and 18, this difference being moreover generally non-zero (in particular at least 2, 2 and 1, respectively). In one advantageous embodiment of the invention, the coating is also chosen so as to have a higher luminance L* than the panel. Also advantageously, the coating is chosen so as to have an a* and/or b* value of opposite sign to the a* and/or b* value of the panel, respectively.

In general, and preferably for light-colored panels, in particular the aforementioned substantially white panels, the coating used has colorimetric coordinates L*, a*, b* such that 70<L*<90, −15<a*<25 and −6<b*<20. Particularly preferably, the coating is chosen from the following coatings: a coating of light green color, especially pistachio green or celery (leaf) green, in particular having colorimetric coordinates L*, a*, b* such that 83<L*<89, −14<a*<−4 and 2<b*<20 (in particular, in the case of the pistachio green coating, having colorimetric coordinates such that 83<L*<86, −7<a*<−4 and 2<b*<16); a coating of light grey color, in particular having colorimetric coordinates L*, a*, b* such that 78<L*<81, −0.5<a*<7 and 3<b*<10; a coating of light pink/lavender/purple color, in particular having colorimetric coordinates L*, a*, b* such that 87<L*<89, −0.5<a*<5 and −6<b*<−3; and a coating of light ochre color, in particular having colorimetric coordinates L*, a*, b* such that 80<L*<86, 0<a*<6 and 3<b*<20. Particularly preferred coatings are detailed in the examples provided below.

For comparison, a black paint has for example respective colorimetric coordinates L*, a* and b* of around 25.5, 0.2 and −1.2 or 16.1, 0.3 and 5.5, a dark grey paint around 41.5, 0.2 and 0, and a paint considered to be perfectly white around 95.8, −1.3 and 3.1.

Apart from its color, the coating according to the invention is chosen so as to withstand high temperatures and to exhibit stability in terms of its color and its cohesion with the panel, so as not to affect the mechanical properties of the panel. Advantageously, it has a degradation temperature above 280 or 300° C. (preferably between 350° C. and 500° C.) and is preferably based on one or more resins, such as a silicone resin, possibly modified by the incorporation of at least one alkyd resin, and/or a polyimide, polyimide, polyfluorinated and/or polysiloxane resin, etc., this coating also being filled with one or more pigments, such as pigments for enamels, and/or colorants, so as to obtain the desired color, and possibly being diluted in order to adjust its viscosity (for example around 32 000-35 000 cP during deposition by screen printing) for the purpose of applying it to the glass-ceramic, the diluent or solvent being removed, where appropriate, during the subsequent curing of the coating. The aforementioned resins are in particular able to withstand induction heating and may also be suitable (in particular for the above crosslinkable or crosslinked or pyrolysed polysiloxane resins) for other types of heating (using a gas burner, or even radiant or halogen heating). The coating may optionally include mineral fillers (especially those having a lamellar structure), for example for mechanically reinforcing the deposited coating layer, for contributing to the cohesion of said layer, to its bonding to the panel, for preventing the appearance and propagation of cracks within it, etc.

The present invention also relates to a process for manufacturing the panel according to the invention, in which the above coating is applied to the panel, preferably by screen printing (either on the precursor glass before ceramification or, more generally and preferably, on the glass-ceramic panel after ceramification), said coating being optionally dried and then generally cured.

As a reminder, the manufacture of glass-ceramic panels generally takes place as follows: the glass of chosen composition is melted for forming the glass-ceramic in a melting furnace, the molten glass is then rolled (laminated) into a standard ribbon or sheet, by making the molten glass pass between rolling rolls, and the glass ribbon is cut to the desired dimensions. The panels thus cut are then ceramified in a manner known per se, the ceramification consisting in firing the panels with the thermal profile chosen to convert the glass into a polycrystalline material called “glass-ceramic”, the expansion coefficient of which is zero or almost zero and which is resistant to a heat shock possibly up to 700° C. The ceramification generally comprises a step of progressively raising the temperature up to the nucleation range, generally in the vicinity of the glass conversion range, a step of passing through the nucleation range over several minutes, a further progressive rise in the temperature up to the ceramification hold temperature, the ceramification hold temperature being maintained for several minutes, followed by rapid cooling down to room temperature. Where appropriate, the process also includes a cutting operation (generally before ceramification), for example using a water jet, mechanical scoring using a scoring wheel, etc., followed by a fashioning operation (grinding, bevelling, etc.).

Preferably, the coating according to the invention is deposited on the panel by screen printing. After deposition, the coated glass-ceramic panel is optionally dried (for example in the ambient air, or possibly by infrared or in an oven) so as, where appropriate, to evaporate the solvent (medium), to fix the coating and allow the panel to be handled, the thickness of the coating generally being around 1 to 25 μm, and then the coating generally undergoes a curing operation at temperatures between for example 80° C. and 450° C.

The coating may constitute the sole coating of the panel or may be combined with other layers (for example an enamel layer) that are applied to the same face or to the opposite face. It exhibits good ageing and heat-shock resistance, good mechanical strength properties, good abrasion resistance, good stain resistance, etc., in accordance with the desired properties of glass-ceramic panels.

The glass-ceramic substrate used to form the panel according to the invention may be smooth and plane, or it may have inclined parts or (especially on the upper face) at least one raised region and/or at least one recessed region and/or at least one opening, for example, in the case of a gas cooker, at least one opening intended to receive an atmospheric-gas burner. The lower face may be smooth or may have raised features and/or recesses, for example small raised features or studs giving the panel better mechanical strength.

The panel according to the invention may, where appropriate, be provided (or associated) with one or more additional functional or decorative elements (frame, connector(s), cable(s), control element(s), display(s), for example what are called “7-segment” light-emitting diodes, electronic control panel with touch-sensitive controls and digital display, etc.). The panel according to the invention may advantageously be mounted on an insulating support, inside which the one or more heating elements are placed, without an intermediate complex aiming at masking the interior of the apparatus from the user’s view.

The invention also relates to the high-temperature-maintaining and/or cooking devices that include at least one panel according to the invention (for example cookers and set-in hotpanels), in particular cooking devices using induction heating means, or halogen heating means, etc. The invention covers both cooking devices having a single panel or cook-top and devices having several panels or cook-tops, each of these cook-tops having a single heater or multiple heaters. The term “heater” is understood to mean a cooking location. The invention also relates to hybrid cooking devices, the cook-top(s) of which has several types of heater. Furthermore, the invention is not limited to the manufacture of cook-tops for cookers or cook tops. The panels manufactured according to the invention may also be other panels (chimney inserts, fire wall, etc.) that have to be very insensitive to temperature variations.

Moreover, the present invention also relates to a process for producing a high-temperature-maintaining and/or cooking device, in which a glass-ceramic panel is mounted on the structure of the high-temperature-maintaining and/or cooking device, said process using a panel according to the present invention, and/or comprising a step of coating at least one region of that face of the panel that has to be turned towards the structure and/or at least one region of the structure on which the panel has to be mounted, before said panel is mounted, with a coating, said coating being such that the total color difference delta E*, measured on the opposite face of the panel to that turned towards the structure, between said coated region and an uncoated region, is less than about 1 and/or such that this coating has a luminance L* greater than about 70. The present invention also relates to the device obtained.

Other details and advantageous features will become apparent below from the description of non-limiting exemplary embodiments of panels according to the invention in combination with FIGS. 1 and 2.

In the embodiments illustrated, the panel is for example based on a glass-ceramic formed from a glass having a composition close or identical to those indicated in patent FR 2 766 816. This glass is melted at around 1650° C. in a quantity such that a glass ribbon can be rolled, from which ribbon glass panels having final dimensions of 56.5 cm×56.5 cm×0.4 cm are cut.

These glass panels were ceramified on ceramic grids using a ceramification cycle comprising the following steps:

a) the temperature was raised at 30-80° C./min up to the nucleation range, generally lying close to the glass conversion range;

b) the temperature passed through the nucleation range (670-800° C.) over about 20 minutes with a temperature hold of a few minutes;

c) the temperature was raised over 15 to 30 minutes up to the ceramification hold temperature T of around 1030° C.;

d) the ceramification hold temperature T was maintained for a time t of around 20 minutes; and e) the panel was rapidly cooled down to room temperature.

At the end of the ceramification cycle, the panel had the β-spodumene crystal phase and had the following colorimetric coordinates: L*=82.16, a*=−2.44 and b*=−3.65 (example A of a panel appearing white) or L*=81.13, a*=−2.55 and b*=1.54 (example B of a panel appearing cream-white).

Figure 1:
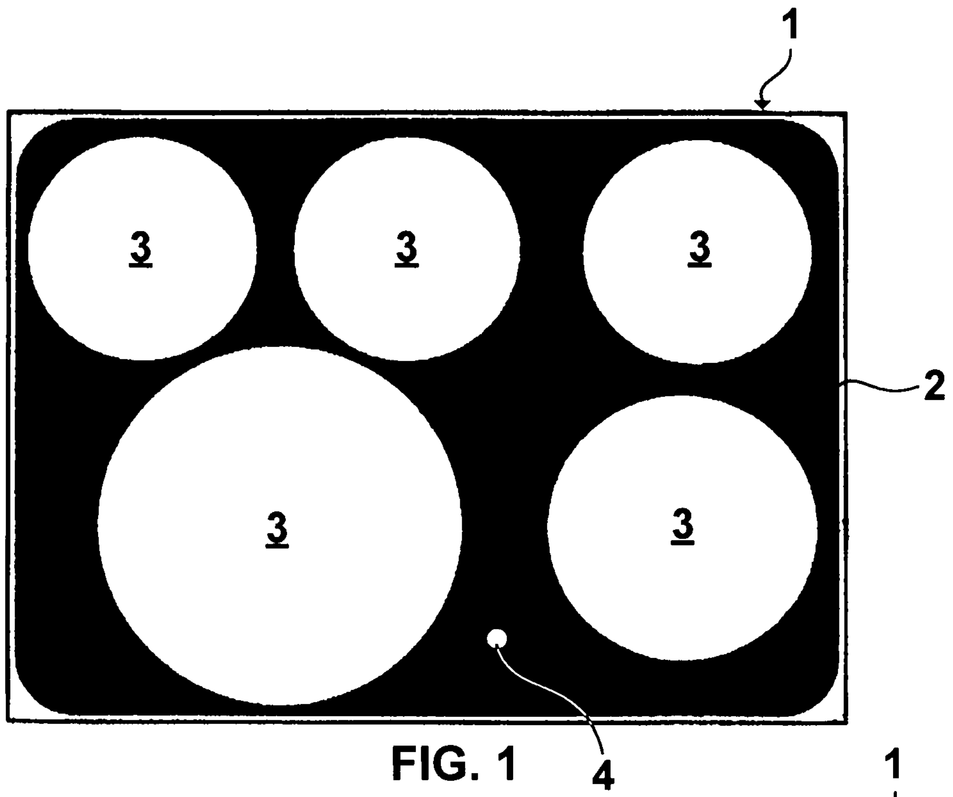
FIG. 1 shows a panel according to the invention in which the coating (2) covers the entire lower face of the panel (1) with the exception of the heating regions (3) and the displays (4)
Figure 2:
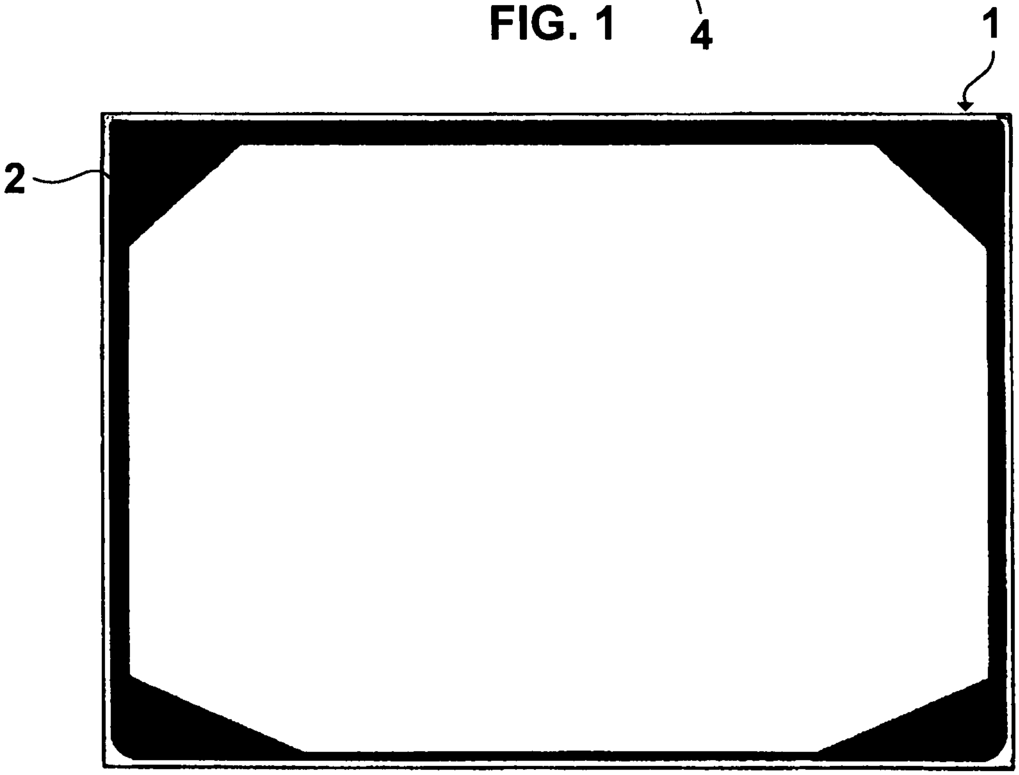
FIG. 2 shows another panel according to the invention in which the coating (2) masks the frame on which the panel is mounted.
Figure 3:
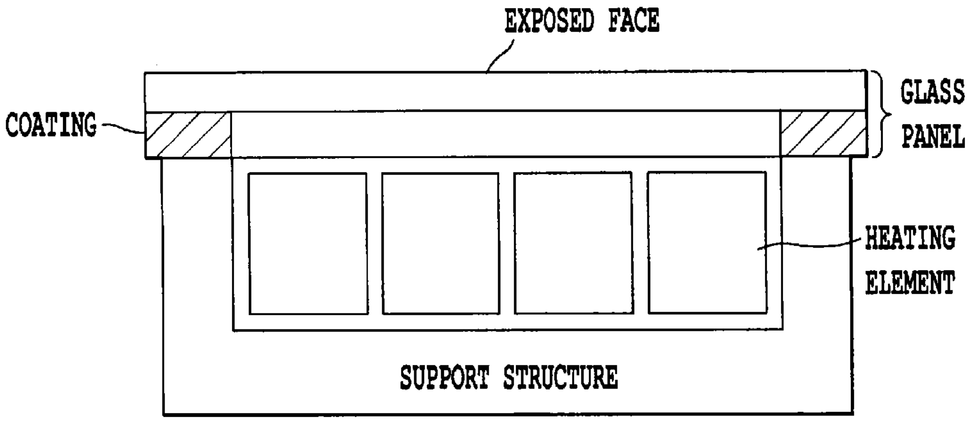
FIG. 3 illustrates the support structure, glass panel, coating and heating elements and other features of an embodiment of the invention.

The panels obtained were coated, by screen printing using conventional polyester fabrics, on their lower face, with the exception where appropriate of the location of the displays and of the heating regions (FIG. 1) or of the central part (FIG. 2), with a coating layer in the form of a paint based on a silicone resin sold by Aremco under the reference CP4050, this paint being modified by the addition of pigments so as to have a pistachio green color with the colorimetric coordinates L*=83.44, a*=−5.56 and b*=6.07, this paint being diluted as required by adding water so as to adjust its viscosity (for example around 32 000-35 000 cP during deposition). The paint was then dried in air at room temperature, the thickness of the layer being for example 25 μm, and then cured in an oven at 240° C. and then 300° C. for 1 hour and 30 minutes respectively.

The ΔE* values measured were, respectively, 0.7 for example A and 0.85 for example B and the appearance of the panels seen from their upper face in the use/mounting position was uniform despite the presence of underlying elements such as cooker mounting frames.

Other coatings or paints that were also satisfactory were, again by way of non-limiting example, coatings of the following colors: a paint of light ochre color having colorimetric coordinates L*=84.22, a*=1.95 and b*=5.83, giving ΔE* values of 0.67 for example A and 0.75 for example B; a coating of light grey color having colorimetric coordinates L*=78.49, a*=6.74 and b*=10.09, giving ΔE* values of 0.84 for example A and 0.92 for example B; a coating of light ochre color having colorimetric coordinates L*=85.94, a*=0.18 and b*=10.75, giving ΔE* values of 0.56 for example A and 0.60 for example B; a coating of light purple color having colorimetric coordinates L*=87.27, a*=−0.46 and b*=−2.81, giving ΔE* values of 0.64 for example A and 0.69 for example B; and a coating of light green color having colorimetric coordinates L*=88.84, a*=−13.25 and b*=9.38, giving a ΔE* value of 0.95 for example A.

The panels according to the invention may especially be used to advantage for producing a novel range of cook-tops for cooking appliances.

The invention claimed is:

1. A glass-ceramic panel having opposing faces that is covered on at least one region of a face by a coating that (i) has a luminance L* of greater than about 70, and (ii) imparts a total color difference, delta E*, between the region of the coated face and an adjacent uncoated region as measured through the opposite face of the panel of less than about 1.

2. The glass-ceramic panel according to claim 1, wherein the panel comprises a semi-transparent or translucent glass-ceramic of light or substantially white color.

3. The glass-ceramic panel according to claim 1, wherein a face of the panel that is oriented toward the at least one heating element is at least partly covered by the coating.

4. The glass-ceramic panel according to claim 1, wherein the value of L* of said coating is between 70 and 90.

5. The glass-ceramic panel according to claim 1, wherein the coating imparts a difference between the L*, a*, b* values of the coating and the L*, a*, b* values of the panel, in absolute values, that is respectively less than 12, 20 and 20.

6. The glass-ceramic panel according to claim 1, wherein the region of the face covered by the coating has a higher luminance L* than uncoated parts of the panel.

7. The glass-ceramic panel according to claim 1, wherein the coating has an a* and/or b* value of opposite sign to the a* and/or b* value of the panel, respectively.

8. The glass-ceramic panel according to claim 1, wherein the coating has the following colorimetric coordinates for L*, a*, b*: 70<L*<90, −15<a*<25 and −6<b*<20.

9. The glass-ceramic panel according to claim 1, wherein the coating is selected from the group consisting of:

a coating of light green color having the following colorimetric coordinates for L*, a*, b*: 83<L*<89, −14<a*<−4 and 2<b*<20;

a coating of light grey color having the following colorimetric coordinates for L*, a*, b*: 78<L*<81, −0.5<a*<7 and 3<b*<10;

a coating of light pink/lavender/purple color having the following colorimetric coordinates for L*, a*, b*: $87<L^*<89$, $-0.5<a^*<5$ and $-6<b^*<-3$; and a coating of light ochre color having the following colorimetric coordinates for L*, a*, b*: $80<L^*<86$, $0<a^*<6$ and $3<b^*<20$.

10. A process for manufacturing a panel according to claim 1, comprising:

applying a coating on at least one region of a face of the panel, either on precursor glass before ceramification or on the glass-ceramic panel after ceramification, and, optionally, drying and/or curing said coating, thus producing a coating that (i) has a luminance L* of greater than about 70, and/or (ii) imparts a total color difference, delta E*, between the region of the coated face and an uncoated region of the opposite face of less than about 1.

11. A heating or cooking device having an exposed face for heating or cooking comprising the glass-ceramic panel according to claim 1 and one or more heating elements.

12. A process for making a heating or cooking device that contains at least one heating element comprising:

mounting the glass-ceramic panel of claim 1, which has opposing faces, on a support structure containing one or more heating elements so that a face having a coated portion is on a side of the panel that faces the at least one heating element.

13. A heating or cooking device obtained according to the process of claim 12.

14. The panel of claim 1, wherein (ii) imparts a total color difference, delta E*, between the region of the coated face and an adjacent uncoated region of the same face as measured through the opposite face of the panel of 0.3 to 0.9.

15. The panel of claim 1, wherein (ii) imparts a total color difference, delta E*, between the region of the coated face and an adjacent uncoated region of the same face as measured through the opposite face of the panel of 0.5 to 0.85.

16. The panel of claim 1, wherein the coating is selected to have an a* and/or b* value of the opposite sign to that of the panel.

17. A glass-ceramic panel or plate for covering or receiving one or more heating elements comprising:

a glass ceramic panel or plate having upper exposed face and an opposite lower unexposed face, wherein the upper exposed face is part of a cooking surface and the lower unexposed face is oriented toward one or more heating elements and is covered on at least one region by a coating, wherein the coating (i) has a luminance L* of greater than about 70 and (ii) imparts a total color difference, delta E*, of less than 1.1, wherein delta E* is measured between the region of the coated unexposed face and an adjacent uncoated region of the unexposed face as measured through the opposite exposed face of the panel.

18. The glass-ceramic panel or plate of claim 17, wherein the color change, delta E* is less than 0.95.

19. The glass-ceramic panel or plate of claim 17, wherein the color change, delta E* ranges between 0.3 and 0.9.

20. The glass-ceramic panel or plate of claim 17, wherein the color change, delta E* ranges between 0.5 and 0.85.

21. A heating device comprising the glass-ceramic plate of claim 17 wherein the exposed face is a cooking surface and the unexposed face is internally oriented toward one or more heating elements.

* * * * *